US008555176B2

(12) United States Patent
Elumalai et al.

(10) Patent No.: US 8,555,176 B2
(45) Date of Patent: Oct. 8, 2013

(54) THIRD PARTY MENUS FOR ENABLING COLLABORATION

(75) Inventors: Arulkumar Elumalai, Lynnwood, WA (US); Kelly Elizabeth Rollin, Seattle, WA (US); Vinit Chandrakant Deshpande, Woodinville, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 11/684,690

(22) Filed: Mar. 12, 2007

(65) Prior Publication Data
US 2008/0229239 A1 Sep. 18, 2008

(51) Int. Cl.
*G06F 3/00* (2006.01)

(52) U.S. Cl.
USPC .......................................... 715/751; 715/810

(58) Field of Classification Search
USPC ......... 715/733, 734, 735, 739, 741, 742, 743, 715/744, 746, 747, 751, 752, 753, 810, 811, 715/825, 826
See application file for complete search history.

(56) References Cited

U.S. PATENT DOCUMENTS

| 5,283,856 | A | 2/1994 | Gross et al. | |
| 6,493,006 | B1 | 12/2002 | Gourdol et al. | |
| 6,952,717 | B1 * | 10/2005 | Monchilovich et al. | 709/205 |
| 7,299,257 | B2 * | 11/2007 | Boyer et al. | 709/204 |
| 7,350,204 | B2 * | 3/2008 | Lambert et al. | 717/172 |
| 7,464,137 | B2 * | 12/2008 | Zhu et al. | 709/204 |
| 7,516,191 | B2 * | 4/2009 | Brouk et al. | 709/217 |
| 2003/0177184 | A1 * | 9/2003 | Dickerman et al. | 709/204 |
| 2004/0054740 | A1 | 3/2004 | Daigle | |
| 2004/0174905 | A1 | 9/2004 | Caspi | |
| 2004/0192440 | A1 | 9/2004 | Evans | |
| 2005/0060655 | A1 * | 3/2005 | Gray et al. | 715/745 |
| 2005/0216834 | A1 * | 9/2005 | Gu | 715/522 |
| 2005/0261964 | A1 | 11/2005 | Fang | |
| 2006/0168015 | A1 | 7/2006 | Fowler | |
| 2007/0092070 | A1 * | 4/2007 | Croy et al. | 379/45 |
| 2007/0113187 | A1 * | 5/2007 | McMullen et al. | 715/742 |
| 2007/0150551 | A1 * | 6/2007 | Krishnan et al. | 709/218 |
| 2007/0192705 | A1 * | 8/2007 | Lee | 715/739 |
| 2008/0147695 | A1 * | 6/2008 | Masek | 707/101 |

FOREIGN PATENT DOCUMENTS

WO          WO0139046          5/2001

OTHER PUBLICATIONS

TESSOT. "Technical Paper: Instant Messenger" (2003) Alcatel Telecommunications Review. 4th Quarter, 8 pages.
YAHOO! Instant Messenger http://developer.yahoo.com/messenger/last viewed Nov. 10, 2006, 4 pages.

* cited by examiner

*Primary Examiner* — Rashawn Tillery

(57) ABSTRACT

The claimed subject matter can provide an architecture and various mechanism whereby a communication client can facilitate a more robust collaboration experience. The communication client can provide configurable menus for launching third-party resources locally and transmitting resource invites to remote entities along with appropriate information to enable the remote entities to launch the resource locally as well. The architecture can provide for peer-to-peer collaboration sessions as well as server directed collaboration sessions.

20 Claims, 11 Drawing Sheets

THIRD PARTY MENUS FOR ENABLING COLLABORATION

BACKGROUND OF THE INVENTION

With the recent growth of communication services and/or communication clients, people are communicating more than ever before, and in ever-increasing formats. What started with simple email clients configured to access an email account for a local dial-up ISP has evolved into very sophisticated web-based email services that can be accessed from anywhere and can include a variety of other communication mechanisms such as messaging and real-time chat.

In a slightly different domain, and given the popularity of real-time communication, many vendors developed their own chat-based messaging clients to be used with their own proprietary chat services (or in some cases to span multiple chat clients/services) to augment or in some cases replace traditional email clients or email-style communication. As these chat based-messenger clients evolved, the ability to communicate in forms of media other than plain text evolved in tandem. For example, communication clients expanded their repertoire to include emoticons, file transfers, audio, video, as well as plain text.

As a result, users of modern communication clients can communicate in ways that were scarcely imagined a few decades ago. However, one form of communication that is missing from modern communication clients is the ability to collaborate in the context of an application. For example, information associated with an application running on a one user's machine may not be readily experienced by a another user, even if that other user has access to or is running the identical application and both users are communicating in real-time by way of a conventional communication tool. While certain data can, e.g. be highlighted and subsequently cut and pasted into a chat window, actual collaboration in the context of the application has not been adequately provided by convention communication clients.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises an architecture and suitable mechanisms whereby a communication client can facilitate a more robust collaboration experience. To the accomplishment of the foregoing and other related ends, the communication client can include a menu for launching third party applications or other disparate resources. In accordance therewith, the menu can be extensible to enable a third party or substantially any user or group of users to include menu items in the menu to serve as links and/or references to the third party application (or other disparate resource). Upon selecting (e.g., clicking) on one of the configurable menu items, the associated application can be launched by the communication client, and a collaboration session can ensue without substantially any number of remote participants by employing the architecture and/or framework of the communication client, but with communication occurring in the context of the application.

For example, the communication client can populate the menu items to be displayed based upon a registration key associated with the application. The communication client can, e.g., launch the application with a set of input parameters that can be produced based upon a selection of remote contacts (such as from a contacts list maintained by the communication client) and/or based upon information included in the registration key. Moreover, when an application is launched, the communication client can transmit an application (or resource) invite. The application invite can be transmitted to the selected contacts, and, upon acceptance of the application invite, the application can be launched locally on the remote end-point by that end-point's communication client, and a rich collaboration session can result.

In accordance with an aspect of the claimed subject matter, the collaboration session can be instigated and managed by a communication server. As one example, the application invite (or other suitable information) can be transmitted to the communication server in addition to or alternatively to being transmitted to the selected contacts. The communication server can allocate resources for the desired collaboration, schedule activities associated with the desired collaboration, as well as provide other potentially very rich collaborative features.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
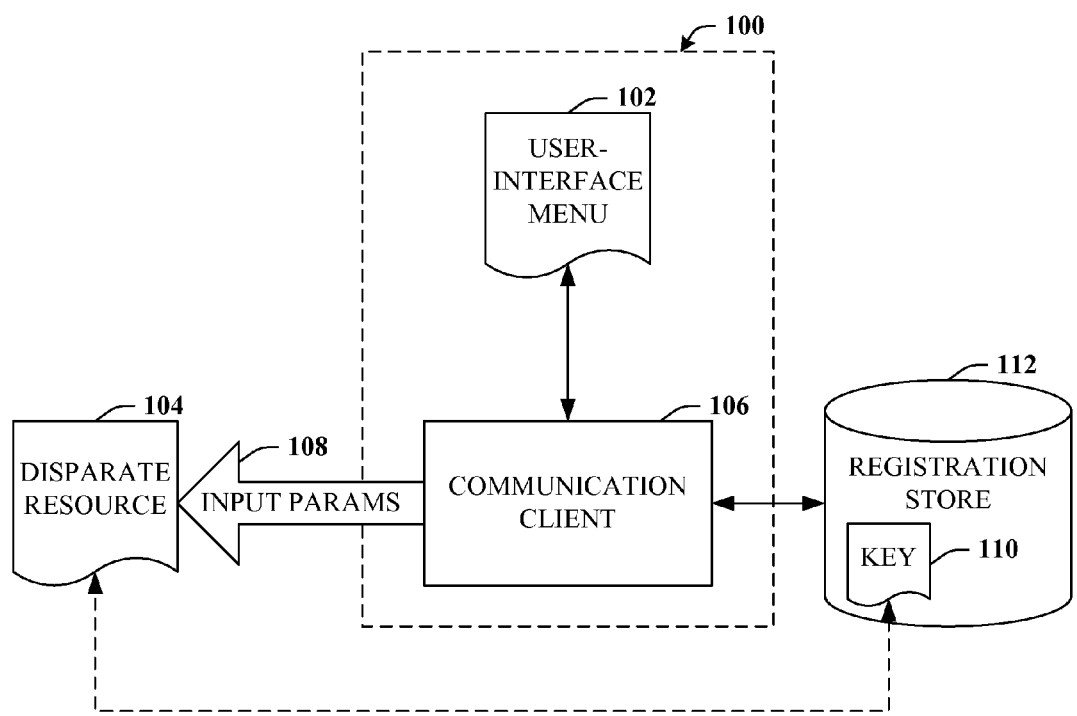
FIG. 1 is a block diagram of an exemplary computer-implemented system that can facilitate a more integrated collaboration experience.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "client", "entity" or the like are generally intended to refer to a computer-related elements, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring initially to the drawings, FIG. 1 depicts a block diagram of a computer-implemented system 100 that can facilitate a more integrated collaboration experience. Generally, the system 100 can include a user-interface menu 102 that can be configured to display a menu item associated with a disparate resource 104. For example, the user-interface menu 102 can be extensible by allowing the creation and/or inclusion of menu items associated with any suitable resource (e.g. disparate resource 104), which is illustrated in more detail in connection with FIGS. 3A and 3B. Typically, the disparate resource 104 is an application, and, in particular, an application suitable for remote collaboration between one or more users. However, such need not always be the case. Rather, in accordance with an aspect of the claimed subject matter, the disparate resource 104 can be a web document or substantially any resource that can leverage and/or take advantage of a collaborative environment.

The system 100 can also include a communication client 106 that can be substantially any suitable application, tool, utility or the like that can, inter alia, facilitate communications between multiple parties, users, entities, etc. In accordance therewith, the communication client 106 can be equipped with features for propagating chat, email, audio, video, and so forth, as well as collaborative experiences in connection with the disparate resource 104, as detailed herein. While conventional communication tools can provide a variety of useful mechanisms for communicating with others, oftentimes, certain information desired to be shared exists in one context that is not readily translated into another context. For example, information associated with an application (e.g., disparate resource 104) running on a first user's machine may not be readily experienced by a second user, even if the second user is running the identical application and both users are communicating in real-time by way of a conventional communication tool.

In order to mitigate these and other difficulties, the communication client 106 can launch a disparate resource 104 (or an application associated with the disparate resource 104) in order to enable a collaboration session and/or facilitate a more integrated collaboration experience with respect to the disparate resource 104. It should be appreciated that the disparate resource 104 need not be associated with the communication client 106. Rather, the disparate resource 104 can be a provided, designed, created, distributed, and/or managed by one or more third parties. As one non-limiting example, the disparate resource 104 can be a custom application developed in-house and employed as an integral part of product design for an enterprise.

To facilitate a more integrated collaboration experience between, e.g. employees of the enterprise collaborating on a product design, the enterprise can plug-in the custom application to the extensible user-interface menu 102. Accordingly, any given employee can launch the custom application by clicking on the associated menu item of menu 102. In addition, said employees can collaborate with one another (e.g., by way of the communication client 106) in the context of the custom application, rather than merely in the context of conventional communication mechanisms such as chat, video conferencing, or the like.

While applications and other disparate resources 104 can be designed to collaborate unaided by other components, there are numerous advantages to employing the communication client 106 to facilitate the collaboration. For example, disparate resource 104 can approach the collaboration in a more abstract manner, without concern for many specific implementation details. Moreover, by employing the communication client 106, the disparate resource 104 can leverage existing infrastructure as well as existing user data such as associations, preferences, histories, and so on.

In accordance with an aspect of the claimed subject matter, the communication client 106 can launch the disparate resource 104 with a set of input parameters 108. The input parameters 108 can be tokenized such that a single string (e.g., in connection with a path and/or command line) can represent the entirety of the input parameters 108. By way of example, the input parameters 108 can include but are not limited to a user ID and a contact ID, as well as other data employed to aid in collaboration such as environmental variables for the disparate resource 104. The user ID can be a value or representation associated with the communication client 106 and/or a user of the communication client 106 and can be automatically extracted from configuration data when the disparate resource 104 is launched. The contact ID can be one or more users from, e.g., a colleagues or contacts from a contact list or search results (not shown). Thus, the input parameters 108 can signify both the party initiating a collaboration session (e.g., the user ID) as well as the parties to be invited to the collaboration session (e.g., the contact ID). Moreover, the tokens and/or environmental variables can be resolved at run-time, e.g., by supplying user ID and contact ID as %userid% and %contactid%, respectively (or similar). It is to be appreciated that in the event of a conflict between an environmental variable and a reserved token, the reserved token will generally take precedence; however, the communication client 106 can be configured otherwise if desired.

For example, continuing with the scenario introduced supra, one of the enterprise employees can sign-in to the communication client 106, then select one or more colleagues with whom he or she is collaborating to design a product from a contacts list, then launch the disparate resource 104 by selecting the appropriate menu item from the user-interface menu 102. The communication client 106 can then automatically populate the input parameters 108 with the user's ID and either a single contact ID (if only one contact is selected) or a, e.g., comma or semi-colon delimited string of contact IDs (if more than one contact is selected). As a result, a collaboration session can be initiated for the disparate resource 104, which is described in more detail infra.

It is to be appreciated that the user-interface menu 102 can be populated with the menu item associated with the disparate resource 104 based upon information stored in a configurable registration key 110 included in, e.g. a registration store 112. Accordingly, when the communication client 106 is loaded into memory or during boot-up or sign-in, the registration key 110 can be accessed and various checks and/or verifications can be performed. For example, as will be further detailed in connection with FIG. 2, the registration key 110 can include an expected location for the disparate resource 104. If, upon sign-in to the communication client 106, the disparate resource 104 is not found at that location, the communication client 106 can, e.g., ghost out the associated menu item or take another action altogether.

Figure 2:
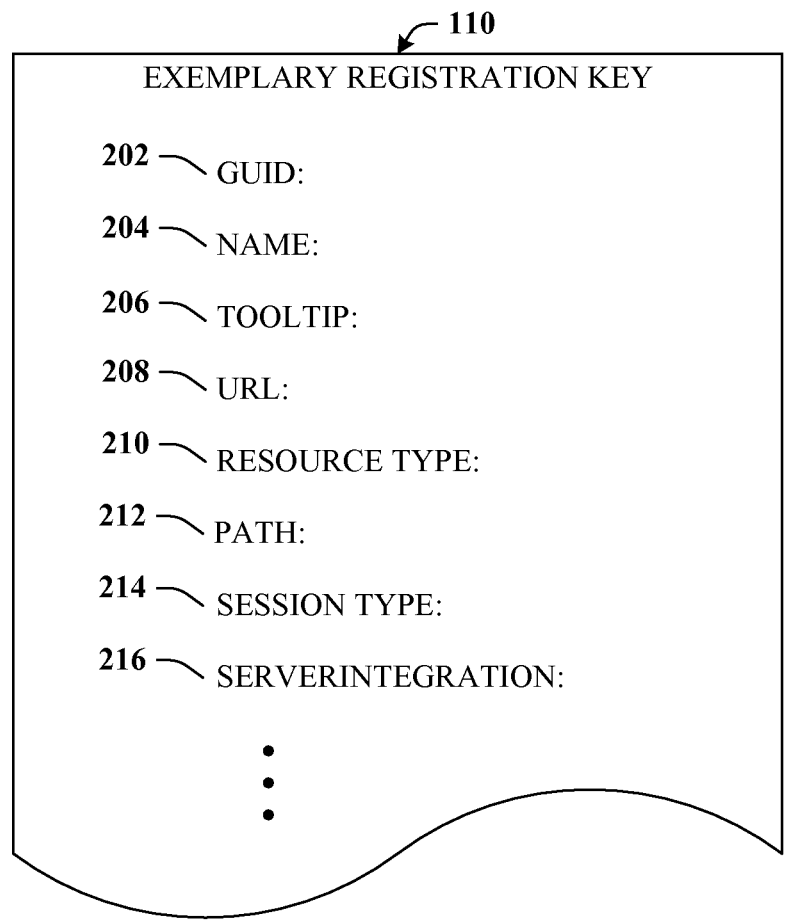
FIG. 2 illustrates an exemplary registration key.

While still referring to FIG. 1, but turning also to FIG. 2, an exemplary registration key 110 is illustrated. The registration key 110 is here explicitly depicted with a number of data fields 202-216 in order to facilitate a concrete understanding of the claimed subject matter. However, it is to be understood that the registration key 110 is intended only as one example, and as such not every data field 202-216 need be present. Likewise, other data fields not shown could exist and are considered to be within the spirit and scope of the claimed subject matter.

In general, the registration key 110 can include a Globally Unique Identifier (GUID) 202. The GUID 202 can be a pseudo-random key that can uniquely (or is statistically certain to uniquely) identify a given resource (e.g., disparate resource 104). Similarly, the registration key 110 can include a name field 204 that can also identify the disparate resource 104. Typically, the name field 204 is imported to the user-interface menu 102 as the menu item described supra. It is to be appreciated that the GUID 202 can distinguish between different versions of a given resource, even if both versions have the same name 204.

In addition, the registration key 110 can include a tooltip field 206. Data in the tooltip field 206 can appear as contextual help on the user-interface menu 102, e.g. upon mouse hover. For example, upon mouse hover over the menu item, data included in the tooltip field 206 can materialize to aid the user in various ways. The Uniform Resource Location (URL) field 208 can specify a download location for the disparate resource 104. Hence, if a disparate resource 104 is not present during sign-in to the communication client 106; or if portions of the disparate resource 104 have been deleted or corrupted, the communication client 106 can automatically download the disparate resource 104 from a remote location, or rebuild or repair the corrupted portions. It is to be appreciated that in many cases an administrator may want to disable this feature in accordance with security protocols or simply general system integrity. Accordingly, the URL field can be intentionally left empty, but in some cases it can be supplied while preferences elsewhere in the communication client 106 can be set to forbid remote downloading unless expressly authorized.

The resource type field 210 can be, e.g. an integer value to denote the resource type of the disparate resource 104. For example, the resource type field 210 can equal "0" for an application with a ".exe" extension (typically the default value); a "1" to signify the disparate resource 104 is a protocol, or a "2" to indicate that the disparate resource 104 is a file with a special extension. Accordingly, the resource type field 210 can provide context to the communication client 106 for the appropriate means for launching the disparate resource. The path field 212 can specify the full path to the location of the disparate resource 104. In addition, the path field 212 can also include the tokenized input parameters 108 described supra.

The registration key 110 can further include a session type field 214. Like the resource type field 210, the session type field 214 can also be populated with an integer, and, as with the resource type field 210, the value of the integer can supply context for how the communication client 106 launches the disparate resource 104. For example, a "0" can indicate that the disparate resource 104 is to be launched locally only. A "1" (generally the default) can denote that the disparate resource 104 is to be launched in a manner suitable to peer-to-peer collaboration, whereas a "2" can signify that the collaboration session type is to be multiparty, which can, inter alia, imply that a communication server will manage the communication session. It is to be appreciated that a peer-to-peer session type 214 can allow for collaboration between many parties or be limited to merely two parties. In accordance with another aspect, a distinct session type 214 can be provided to signify that only two parties can be privy to a collaboration session.

Additionally, the registration key 110 can include a server integration field 216 that can be implemented as, e.g. a Boolean flag. Typically the default is set to "FALSE", wherein no further action is required. However, if the server integration field 216 is set to "TRUE", addition aspects of the claimed subject matter can be invoked. Generally, the server integration field 216 will only be set to true with the session type field 214 is set to multiparty (e.g., "2"), which is detailed further infra, in connection with FIGS. 4A-6. However, briefly, it is to be appreciated that in addition to launching a disparate resource 104 locally or performing collaboration in a peer-to-peer manner, the claimed subject matter can provide for a collaboration session that can be hosted by a communication server. In one aspect the communication server can be one that specifically implements a Centralized Conference Control Protocol, however, many of the features described herein can be implemented by way of substantially any communication server that supports conferencing. As such a richer collaboration environment can be provided as described more thoroughly below. It is also to be appreciated that the registration key 110 can be configured by an administrator or user, but additionally or alternatively, various suitable wizards can be provided by the communication client 106 to facilitate configuration of the registration key 110.

Figure 3A:
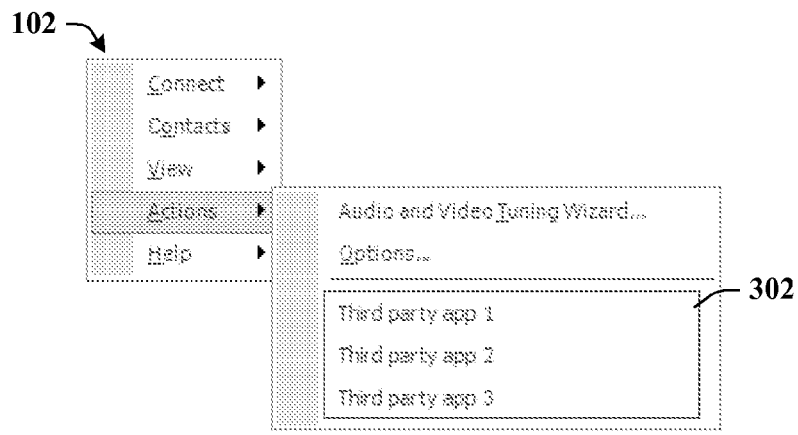
FIG. 3A depicts an exemplary illustrations of the user-interface menu associated with an action menu.
Figure 3B:
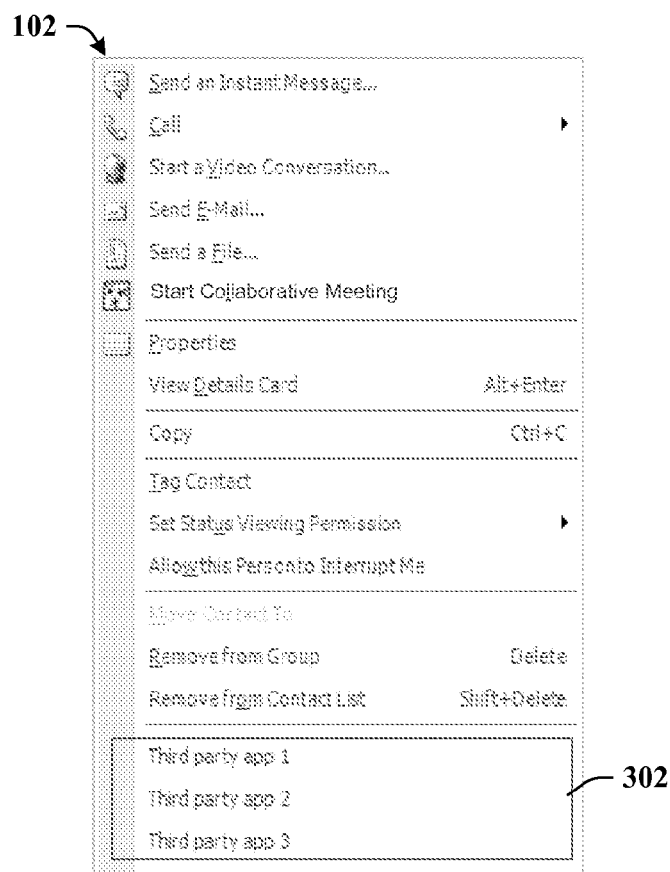
FIG. 3B is an exemplary illustrations of the user-interface menu associated with a context menu.

Referring now to FIGS. 3A and 3B, two exemplary illustrations of the user-interface menu 102 are provided. It is to be appreciated and understood that the illustrations presented in FIGS. 3A and 3B are merely exemplary in nature and not intended to limit the scope of the claimed subject matter. As depicted in each figure, the user-interface menu 102 can be extensible to provide for the inclusion of menu items 302 that can correspond to virtually any suitable resource (e.g., disparate resource 104 from FIG. 1). The menu items 302 are depicted as Third party app 1, 2, and 3, respectively, to underscore that the associated app need not be affiliated with the communication client (e.g., communication client 106 from FIG. 1). Rather, the apps can be custom, in-house solutions created by and/or for third parties, but configured to operate in connection with the communication client. As indicated above, it is to be appreciated that menu items 302 are not limited to merely apps. In addition, while three menu items 302 are shown, there could be more or fewer menu items 302. Finally, it is of course possible for the communication client (or vendor thereof) to supply resources that can be used in connection with the menu items 302. Accordingly, the menu items 302 need not be expressly "third party".

FIG. 3A illustrates an example user-interface menu 102 that can be spawned from, e.g. an action menu provided with the communication client. For example, the example user-interface menu 102 illustrated in FIG. 3A can be accessed by way of a toolbar associated with a main window of the communication client. To provide another example, the example user-interface menu 102 described in FIG. 3B can be displayed as a result of a more contextual user action. For example, a user of the communication client can right-click on a contact from a contact list and be presented with the example user-interface menu 102 depicted in FIG. 3B.

Figure 4A:
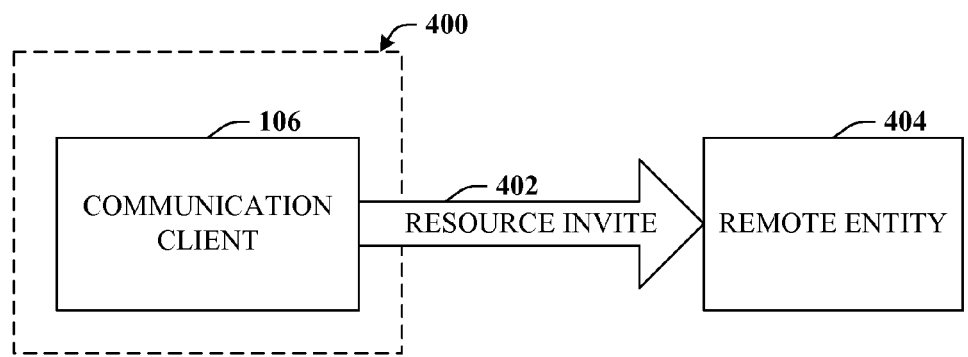
FIG. 4A is a block diagram of an exemplary computer-implemented system that transmits a resource invite.
Figure 4B:
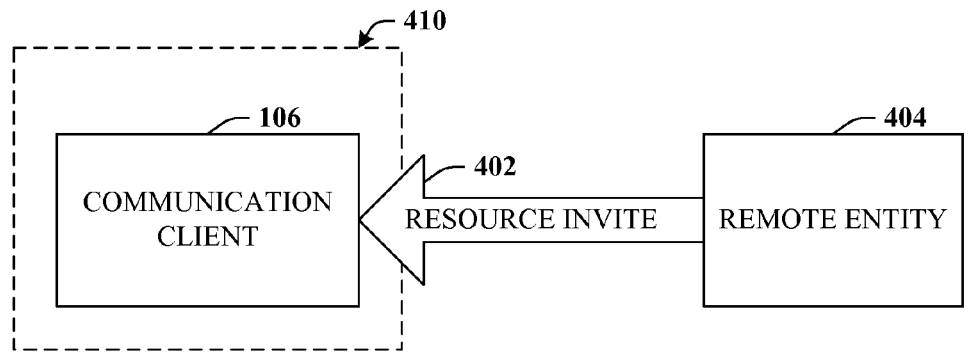
FIG. 4B is a block diagram of an exemplary computer-implemented system that receives a resource invite.

With reference to FIGS. 4A and 4B, two block diagrams of example systems 400 and 410, respectively, are depicted. Generally the systems 400, 410 can be substantially similar to the system 100, described supra in connection with FIG. 1, further comprising a resource invite 402. The resource invite 402 can be employed to provide a more integrated collaboration experience, and can include, e.g. a GUID (e.g., GUID 202 from FIG. 2) associated with a resource (e.g., disparate resource 104 from FIG. 1). In addition, the resource invite 402 can also include a set of input parameters (e.g., input parameters 108 from FIG. 1) such as a user ID, a contact ID, or in some cases a conference Uniform Resource Identifier (URI) (described infra), or other suitable parameters.

In accordance with an aspect of the claimed subject matter, the resource invite 402 can be issued in connection with a session type (e.g., session type 214 from FIG. 2), and propagated to a remote entity 404. In certain cases, such as when the session type 214 denotes a multiparty session, the remote entity 404 can be a communication server (described in more detail with respect to FIG. 6). In those cases, the server integration flag 216 can be set to TRUE to denote a focus group and/or scheduling of the collaboration. In other cases, the remote entity 404 can be another communication client 106, such as a communication client 106 operating on a remote desktop. Thus, while the communication client 106 can issue resource invites 402 as shown in FIG. 4A, the communication client 106 can also be the recipient of a resource invite 402, as illustrated in FIG. 4B. In either situation, the remote entity 404 can be either a communication server or another communication client 106, largely dependent upon the value of the session type 214 when the resource invite 402 is instantiated.

Generally, when the communication client 106 is the recipient of the resource invite 402, that communication client 106 will be associated with (e.g., have a local user ID that is equivalent to) the contact ID specified in the input parameters 108 when the disparate resource 104 was launched and the resource invite 402 generated (e.g., both by a remote communication client 106). Because the GUID 202 can be included in the resource invite 402, the recipient communication client 106 can scan a local registration data store (e.g. registration store 112 from FIG. 1) to match the GUID 202 to a local registration key (e.g., registration key 110 from FIG. 1), then, such as upon acceptance of the resource invite 402, the recipient communication client 106 can launch the associated disparate resource 104 locally, and a collaboration session can ensue. Input parameters 108 and/or environmental variables can be resolved locally at each of the respective end-points.

It is to be appreciated that the resource invite 402 can leverage Session Initiation Protocol (SIP) in order to propagate the resource invite 402 and/or establish a collaborative session. SIP is essentially a request/response protocol. In more detail, SIP is an application-layer control and signaling protocol commonly employed for creating, modifying, and terminating sessions with one or more participants. SIP includes standard headers that can be populated with appropriate information known in the art, and also includes a body field in which application specific data or other content can be inserted. In accordance with an aspect of the claimed subject matter, the body field of a SIP-based packet or stream can include the resource invite 402.

Figure 5:
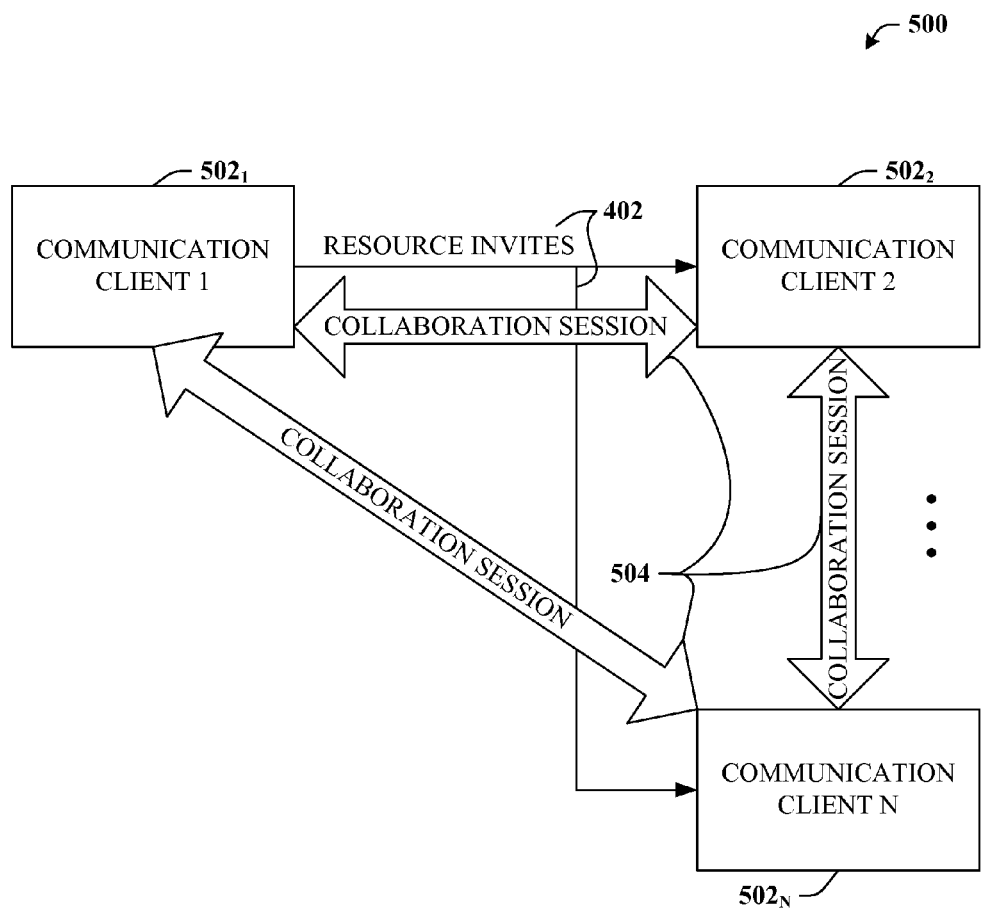
FIG. 5 illustrates a block diagram of an exemplary computer-implemented system facilitates peer-to-peer type sessions.

Turning now to FIG. 5, an exemplary system 500 that facilitates peer-to-peer type sessions is illustrated. As depicted, communication client $502_1$ issues resource invites 402, and transmits the resource invites 402 to potentially any number of remote entities such as communication clients $502_2$-$502_N$ as substantially described above. For example, communication client $502_1$ can enable selection of one or more contacts from a contacts list, which in this case are associated with communication clients $502_2$-$502_N$. The communication client $502_1$ can then access an extensible menu (e.g., user-interface menu 102) and select the menu item associated with the disparate resource 104. Upon selecting the menu item, the disparate resource 104 can be launched locally with suitable input parameters 104 and appropriate resource invites 402 can be transmitted to selected contacts. Upon receiving a resource invite, the selected contacts can acquiesce and the disparate resource can be launched for them as well, and collaboration sessions 504 can ensue between each of the communication clients $502_1$-$502_N$.

Figure 6:
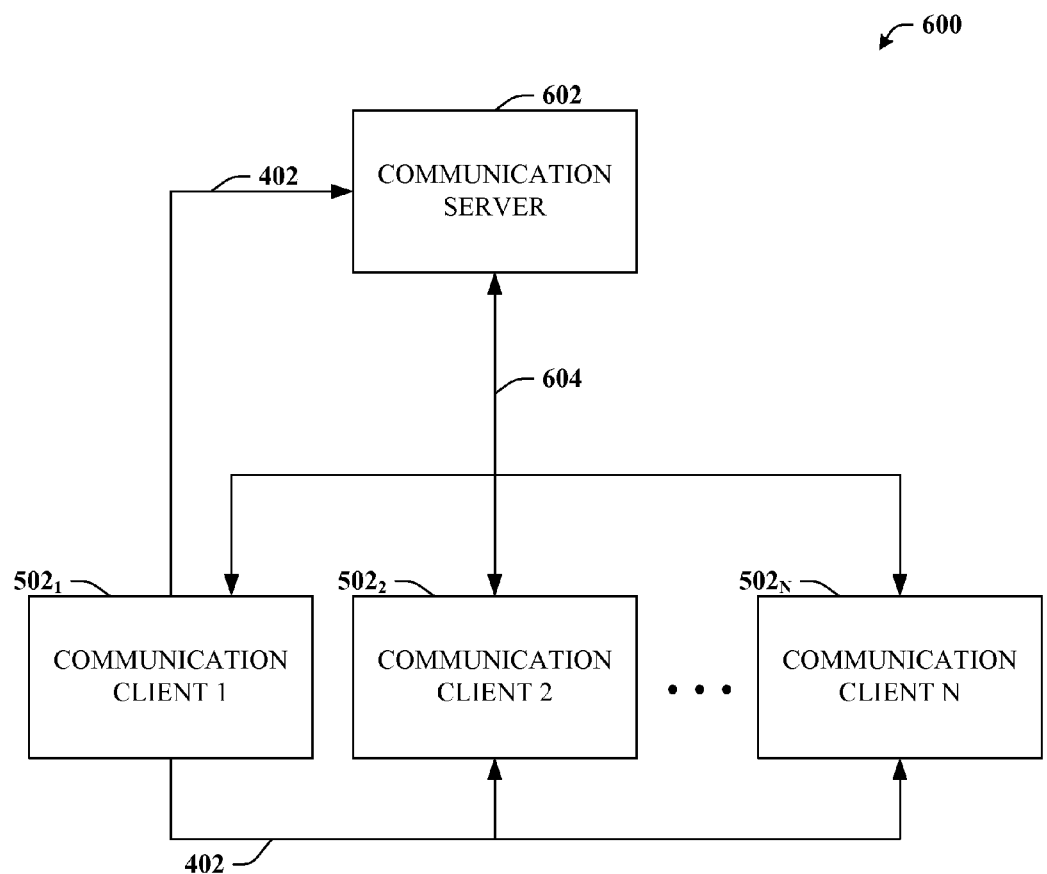
FIG. 6 is a block diagram of an exemplary computer-implemented system that facilitates a multiparty session by way of a server.

Referring to FIG. 6, an exemplary system 600 that facilitates a multiparty session by way of a server is depicted. As in FIG. 5 supra, communication client $502_1$ originates the resource invite 402 that can be delivered to the communication server 602 as well as to the communication clients $502_2$-$502_N$. In an alternative aspect, the communication server 602 can receive the resource invite 402 and forward them to the appropriate destinations (e.g., to communication clients $502_2$-$502_N$). In either case, once the resource invites 402 are received, the communication server 602 can allocate appropriate resources for the eventual collaboration as well as manage the collaboration sessions 604 directly with each of the communication clients $502_1$-$502_N$.

The multiparty communication sessions 604 can be invoked by, e.g., configuring the session type 214 to "multiparty". Moreover, the server integration flag 216 can notify the communication server 602 to take addition steps when allocating resources for all the designated collaboration participants, which can be determined based upon the input parameters 108 included in the resource invite 402. Moreover, the resource invite 402 can, in this situation, appropriate include the conference URI introduced above. It should be understood that by employing the communication server 602, a potentially richer collaboration session 604 can be established as opposed to the peer-to-peer collaboration sessions 504 from FIG. 5. For example, a unified focus session can be facilitated, each communication client can be apprised of a status of other clients, and so forth. In addition, a communication client 502 can also include a multi-point control unit that can control the flow of the media during the collaboration session 604. For example, the communication client 502 can control the actual flow of the media, while signaling this control through the communication server 602.

As indicated supra, in some aspects, the claimed subject matter can be limited such that the session type 214 specifies only two-party communication. This can be in connection with specifying peer-to-peer, or in another manner. Accordingly, there exists the potential for the session type 214 to be configured as two-party, but a user of, say, communication client $502_1$ may select more than one contact. In that event, the communication client $502_1$ can be configured to take a variety of actions in order to resolve such an issue. As one example, the communication client $502_1$ can ghost out the menu items associated with disparate resources 104 that are configured (e.g., by the corresponding registration key 110) to be two party when two or more contacts are highlighted. As another example, the communication client $502_1$ can issue only one resource invite 402 even though multiple contacts were selected (e.g., to the first contact selected). Still another example provides that the recipient communication clients $502_2$-$502_N$ can resolve the matter by allowing only the first client to accept the resource invite 402 to join the collaboration session. Thus, if communication clients $502_2$ accepts the resource invite 402, communication clients $502_N$ can apprise the user that the communication session is already full. Many other potential resolutions to this and other issues can exist and are considered to be within the spirit and scope of the appended claims.

It is also to be appreciated that the communication clients $502_1$-$502_N$ need not necessarily be identical products. Rather, each communication client $502_1$-$502_N$ can potentially be different versions of the same product, or different products from different vendors altogether. Potentially, all that is necessary for the communication clients $502_1$-$502_N$ to establish a collaboration session, either peer-to-peer or with a server topology is that each of the communication clients $502_1$-$502_N$ have the capability to interpret the resource invite 402.

In order to provide addition context with a few tangible examples, consider the following scenarios. A brokerage firm develops or purchases an analysis application for use in analyzing trends for stocks or other securities. The IT admin for the brokerage firm installs copies of the analysis application on each employee machine. Joe, an employee of the brokerage firm signs-in to his communication client, and wants to run the analysis application with Ashley and Ross. Thus, Joe selects both Ashley and Ross from a contacts list provided by his communication client, and then selects the analysis application menu item. The analysis application can then be launched on Joe's machine and appropriate resource invites can be transmitted to Ashley and Ross. Upon accepting the resource invite, the analysis application can be launched locally on Ashley's and Ross' respective desktops as well, and a collaborative session involving stock trend analysis can begin. In many cases, the received resource invite must be accepted before the application is launched on the receiving end. It is to be appreciated that the aforementioned scenario can be performed by way of a peer-to-peer topology or in connection with a communication server.

It is also to be appreciated that a collaboration session need not involve actual joint collaboration between remote users. Rather, as in the case where the session type 214 is set to local only, a form of collaboration can still take place even though the disparate resource may only be active on one user's desktop at a given time. For an illustration, consider the following.

A software developer enterprise has enabled their flagship Integrated Developer Environment (IDE) to capture a given user's SIP URI and present a bug report as a start page. For example, the bug report can include a list of known active and resolved bugs, as well as which bugs are assigned to given developers. On signing-in to the communication client, Frank accesses the menu item associated with the IDE and launches the application locally. By design, the IDE launches with the report of known bugs assigned to Frank. After a productive mornings' work, Frank resolves all the bugs on his docket, closes the IDE application, and leaves for lunch. After lunch, Frank remembers that his coworker, Erin, is out on sick leave, so Frank decides to spend the remainder of the day working on the bugs assigned to Erin. Accordingly, Frank right-clicks on Erin's name in his contact list maintained by the communication client and selects the IDE application by selecting the menu item associated with the IDE application. The IDE application launches again, starting with Erin's bug report.

Figure 7:
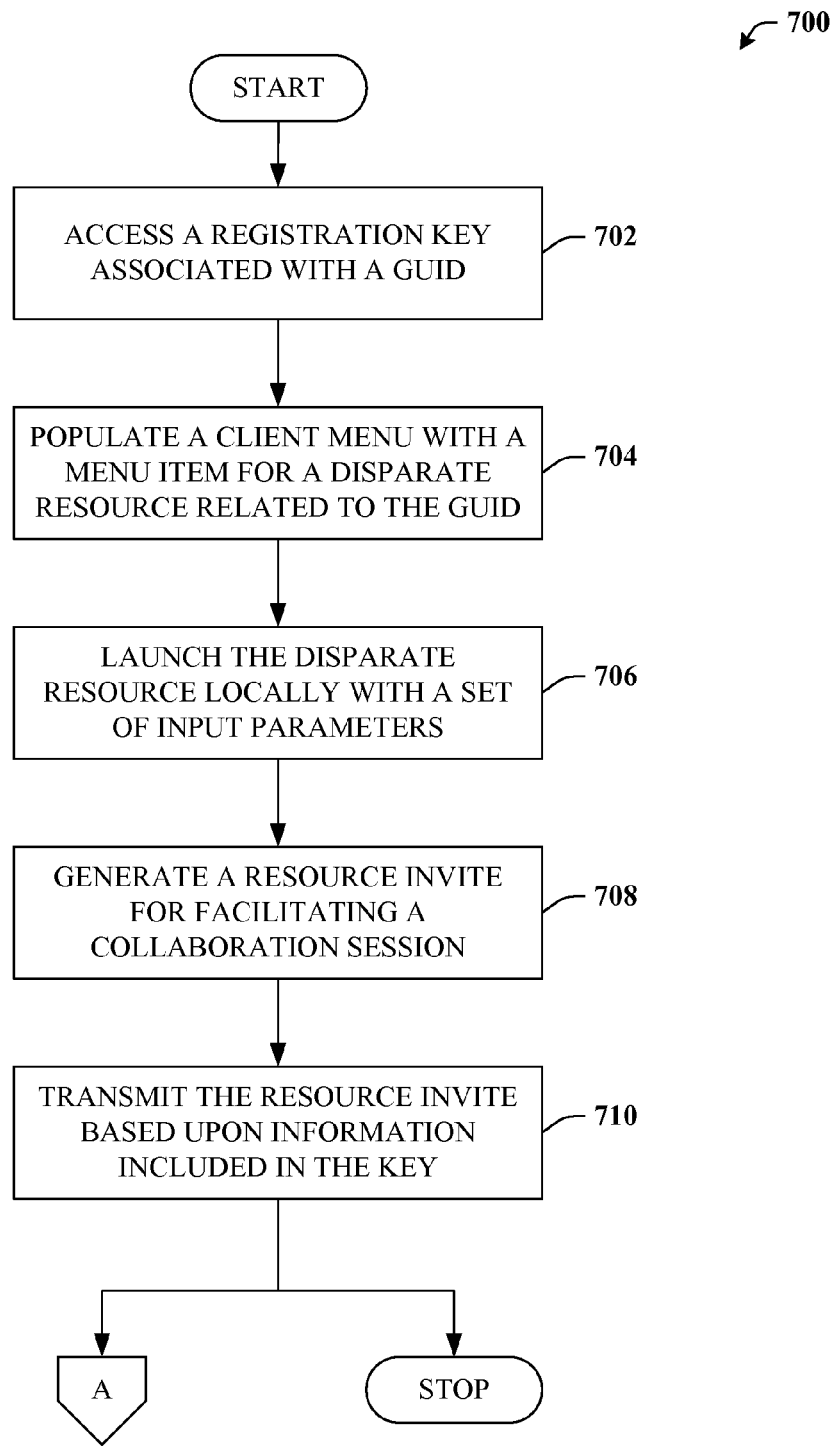
FIG. 7 illustrates an exemplary flow chart of procedures that define a computer-implemented method for facilitating a more robust collaborative experience by requesting a collaboration session.
Figure 8:
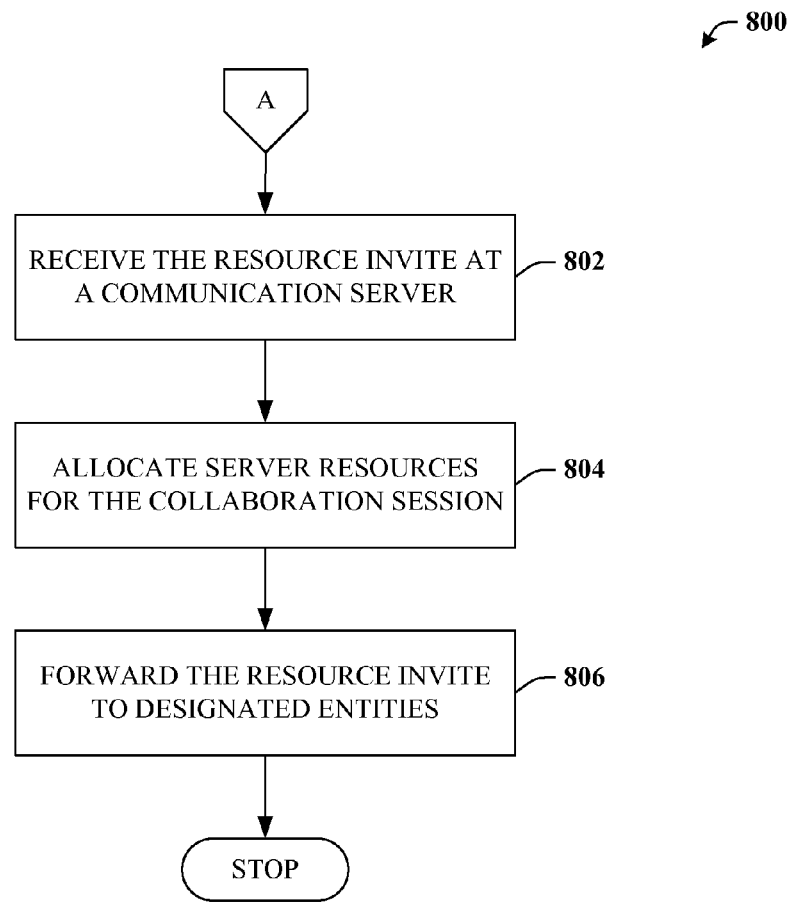
FIG. 8 is an exemplary flow chart of procedures that define a computer-implemented method for employing a communication server in connection with a collaboration session.
Figure 9:
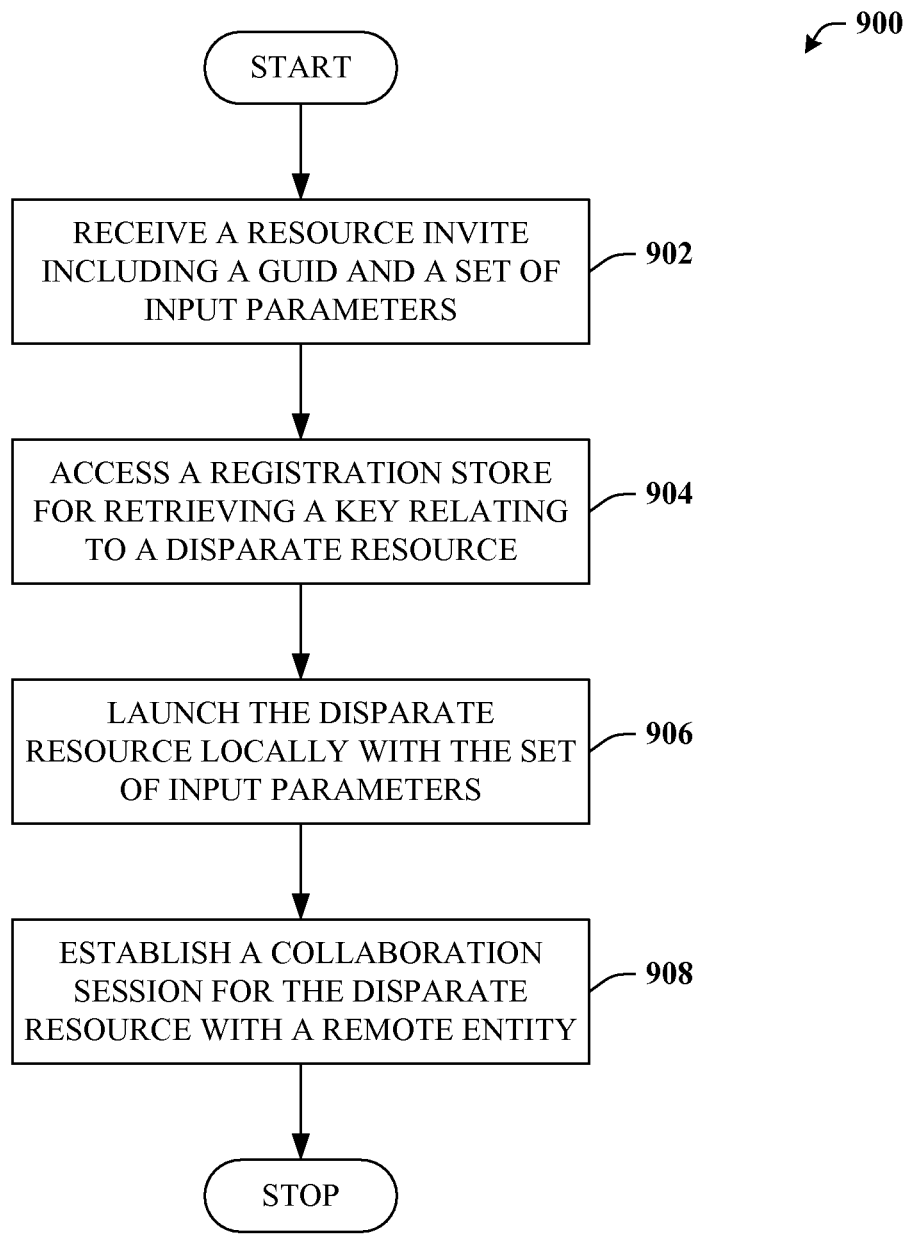
FIG. 9 depicts an exemplary flow chart of procedures that define a computer-implemented method for facilitating a more robust collaborative experience by establishing a collaboration session.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary computer-implemented method 700 for facilitating a more robust collaborative experience by requesting a collaboration session is depicted. Generally, at reference numeral 702, a registration key associated with a GUID can be accessed. It is to be appreciated that the registration key may first be required to be configured. The configuration of the key can be performed automatically by a wizard and/or as part of an installation process of a disparate resource or application. According to an aspect of the claimed subject matter, the registration key can be configured manually as well, e.g., by a user or an administrator desiring to, e.g., plug an existing application into the client.

At reference numeral 704, a client menu can be populated with a menu item for the disparate resource associated with the GUID. For example, upon initialization (or boot, sign-in, or the like) the communication client update, check, or verify the status of disparate resources and populate the client menu accordingly, such as with the name of the disparate resource supplied in a name field of the registration key. At reference numeral 706, the disparate resource can be launched locally with a set of input parameters. Typically, the set of input parameters can include a user ID associated with the communication client, a contact ID that can be one or more selected contacts, and/or in some cases, such as when a communication server will host the collaboration sessions, include a conference URI. It is to be appreciated that the set of input parameters can be tokenized.

At reference numeral 708, a resource invite for facilitating a collaboration session can be generated. Normally, the resource invite will include the GUID and the set of input parameters. It is to be appreciated that the set of input parameters, and by proxy, the resource invite can include additional information to aid in establishing a communication session beyond simply the described user ID, contact ID, and conference URI, and in certain situations a subset of these elements can be optional and/or inferred in another manner consistent with the claimed subject matter. At reference numeral 710, the resource invite can be transmitted based upon information included in the registration key. For example, the registration key can include, inter alia, a session type that can aid and/or define how a collaboration session is to be structured.

Referring now to FIG. 8, an exemplary computer-implemented method 800 for employing a communication server in connection with a collaboration session is illustrated. In general, at reference numeral 802, the resource invite detailed in connection with the method 700 from FIG. 7 supra can be received at a communication server.

At reference numeral 804 the communication server can allocate resources for the collaboration session. For example, the participants designated for the intended collaboration session, and included in the resource invite, can be employed by the communication server to generate a roster list and allocate necessary resources. In addition, for instance when a server integration flag is set, the communication server can provide additional services in connection with conferencing, scheduling, or the like. At reference numeral 806, the resource invite received at the communication server can be forwarded to designate remote entities. In accordance with an aspect of the claimed subject matter, the designated remote entities can receive the resource invite directly from the communication client from which the resource invite originated (as detailed in accordance with the act at reference numeral 710), rather the being forwarded by the communication server. In either case, the designated remote entities are typically other communication clients.

Turning now to FIG. 9, an exemplary computer-implemented method 900 for facilitating a more robust collaborative experience by establishing a collaboration session is depicted. At reference numeral 902, a resource invite can be received. Typically, the received resource invite will include a GUID and a set of input parameters such as user ID, contact, ID, conference URI, etc. At reference numeral 904, a registration data store can be accessed for retrieving information relating to a disparate resource. For example, a registration key associated with the disparate resource can be retrieved from the registration data store based upon the GUID.

At reference numeral 906, the disparate resource can be launched locally with the set of input parameters. For example, the along with the GUID, the registration key can include a path that corresponds to a location for the disparate resource associated with the GUID. The path can also include the set of input parameters to be employed when the disparate resource is launched. At reference numeral 908, a collaboration session for the disparate resource can be established with one or more remote entities.

Figure 10:
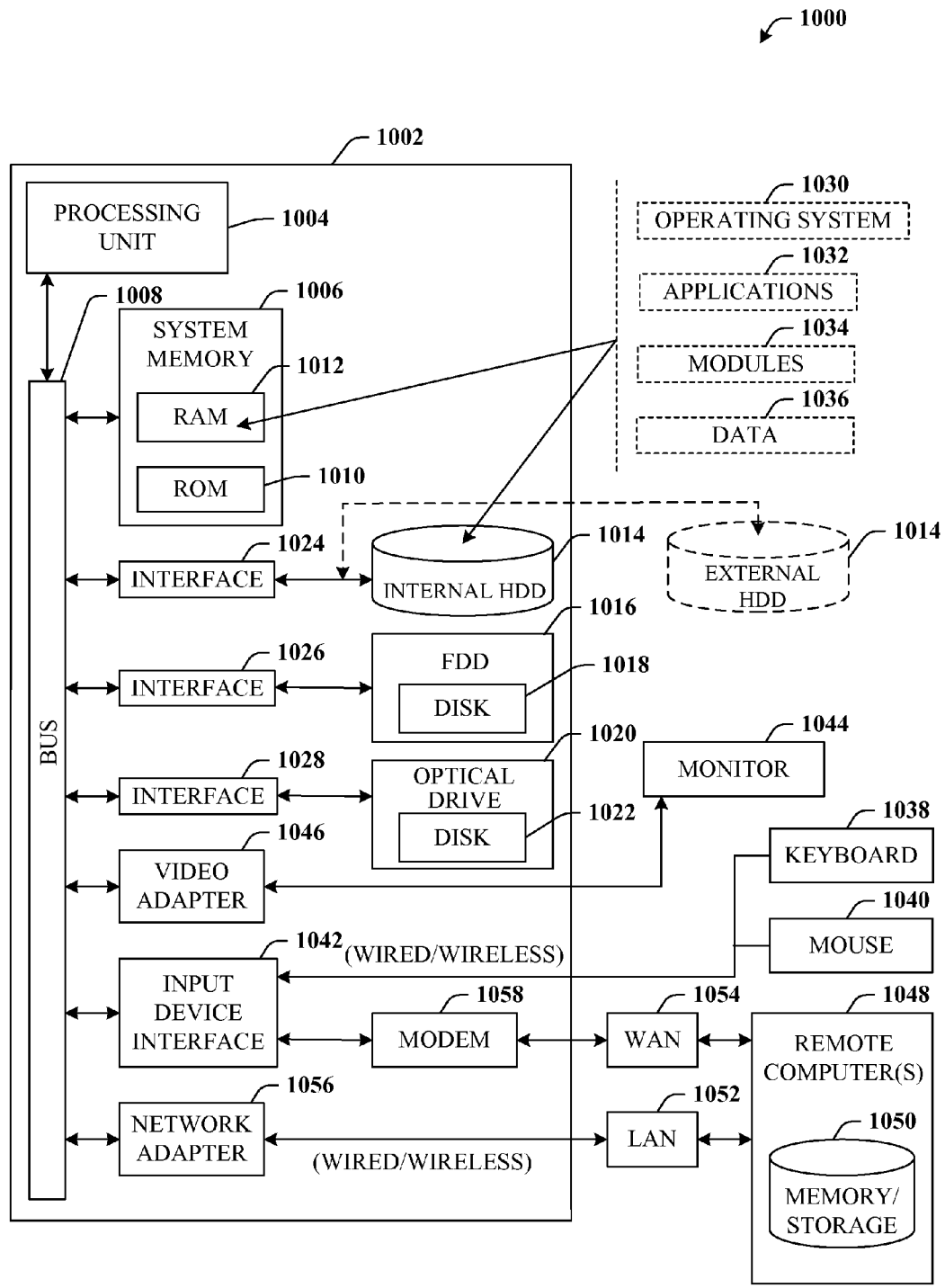
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
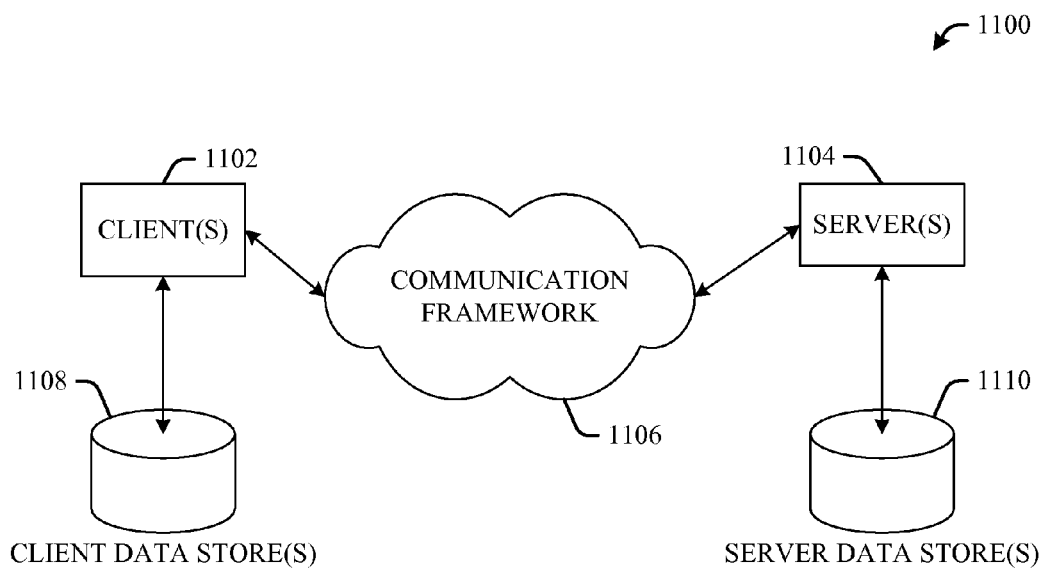
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computing device comprising:
    a processor for executing computer-executable instructions; and
    memory storing computer-executable instructions for:
        configuring registration data associated with a third party application that enables multiparty collaboration, the registration data including:
            a globally unique identifier (GUID) identifying the third party application,
            a uniform resource locator specifying a remote location for downloading the third party application,
            a session type indicating whether the third party application is to be launched locally only, launched for peer-to-peer collaboration, or launched in a collaboration environment hosted by a communication server, and
            a path specifying a local location of the third party application and a set of tokenized input parameters to be resolved when the third party application is launched by a communication client on the computing device, wherein the set of tokenized input parameters includes a tokenized user identification (user ID) parameter and a tokenized contact identification (contact ID) parameter;
        receiving a selection of a contact from a contacts list maintained by the communication client;
        displaying, by the communication client, a user interface menu in response to the selection of the contact, wherein the user interface menu displayed by the communication client includes a menu item associated with the third party application;
        supplying, by the communication client, values for resolving the set of tokenized input parameters in response to selection of the menu item associated with the third party application from the user interface menu displayed by the communication client, the values including:
            a user ID value associated with a user of the communication client, and
            a contact ID value associated with the contact;
        launching, by the communication client, the third party application in accordance with the session type, wherein:
            the third party application is launched from the local location specified by the path with the tokenized user ID parameter resolved by the user ID value and the tokenized contact ID parameter resolved by the contact ID value, and
            the third party application is launched in a context related to the contact if the third party application is launched locally only; and
        transmitting, by the communication client, a resource invite if the third party application is launched for peer-to-peer collaboration or launched in the collaboration environment hosted by the communication server, wherein:

the communication client transmits the resource invite to a remote communication client associated with the contact if the third party application is launched for peer-to-peer collaboration, the communication client transmits the resource invite to the communication server for forwarding the resource invite to the remote communication client associated with the contact if the third party application is launched in the collaboration environment hosted by the communication server, the resource invite transmitted by the communication client includes at least the GUID identifying the third party application, the user ID value, and the contact ID value for enabling the remote communication client associated with the contact to launch the third party application and resolve the set of tokenized input parameters, the resource invite forwarded by the communication server to the remote communication client associated with the contact further includes a conference Uniform Resource Identifier (URI) associated with a collaboration session hosted by the communication server, and upon acceptance of the resource invite by the contact, the third party application is launched by the remote communication client associated with the contact to enable collaboration with the user of the communication client.

2. The computing device of claim 1, wherein the registration data is stored as a configurable registration key.

3. The computing device of claim 1, wherein the remote communication client associated with the contact is configured to launch the third party application locally using a local registration key that corresponds to the GUID identifying the third party application.

4. The computing device of claim 1, wherein the resource invite is included in a body field and is configured to be propagated by Session Initiation Protocol (SIP).

5. The computing device of claim 1, wherein the communication server is configured to allocate resources between the computing device and a remote entity associated with the contact.

6. The computing device of claim 1, wherein the communication server is configured to schedule activities associated with the collaboration session.

7. The computing device of claim 1, wherein:
the set of tokenized input parameters further includes a tokenized conference URI parameter, and
the values supplied by the communication client for resolving the tokenized set of input parameters include the URI associated with the collaboration session hosted by the communication server.

8. The computing device of claim 1, wherein the communication client is configured to receive resource invites from remote entities.

9. The computing device of claim 1, wherein the remote communication client is configured to download or install the third party application in response to the resource invite.

10. The computing device of claim 1, wherein the values supplied by the communication client include a string of contact ID values if more than one contact is selected from the contacts list.

11. The computing device of claim 1, wherein the third party application is a custom in-house application for employees of an enterprise.

12. The computing device of claim 1, wherein the third party application is a product design application.

13. A computer-implemented method performed by a computing device, the computer-implemented method comprising:

configuring registration data associated with a third party application that enables multiparty collaboration, the registration data including:
a globally unique identifier (GUID) identifying the third party application,
a uniform resource locator specifying a remote location for downloading the third party application,
a session type indicating whether the third party application is to be launched locally only, launched for peer-to-peer collaboration, or launched in a collaboration environment hosted by a communication server, and
a path specifying a local location of the third party application and a set of tokenized input parameters to be resolved when the third party application is launched by a communication client on the computing device, wherein the set of tokenized input parameters includes a tokenized user identification (user ID) parameter and a tokenized contact identification (contact ID) parameter;

receiving a selection of a contact from a contacts list maintained by the communication client;

displaying, by the communication client, a user interface menu in response to the selection of the contact, wherein the user interface menu displayed by the communication client includes a menu item associated with the third party application;

supplying, by the communication client, values for resolving the set of tokenized input parameters in response to selection of the menu item associated with the third party application from the user interface menu displayed by the communication client, the values including:
a user ID value associated with a user of the communication client, and
a contact ID value associated with the contact;

launching, by the communication client, the third party application in accordance with the session type, wherein:
the third party application is launched from the local location specified by the path with the tokenized user ID parameter resolved by the user ID value and the tokenized contact ID parameter resolved by the contact ID value, and
the third party application is launched in a context related to the contact if the third party application is launched locally only; and transmitting, by the communication client, a resource invite if the third party application is launched for peer-to-peer collaboration or launched in the collaboration environment hosted by the communication server, wherein:
the communication client transmits the resource invite including to a remote communication client associated with the contact if the third party application is launched for peer-to-peer collaboration,
the communication client transmits the resource invite to the communication server for forwarding the resource invite to the remote communication client associated with the contact if the third party application is launched in the collaboration environment hosted by the communication server, the resource invite transmitted by the communication client includes at least the GUID identifying the third party application, the user ID value, and the contact ID value for enabling the remote communication client associated with the contact to launch the third party application and resolve the set of tokenized input parameters, the resource invite forwarded by the communication server to the remote communication client associated with the contact further includes a conference Uniform Resource Identifier (URI) associated with a collaboration session hosted by the communication server, and upon acceptance of the resource invite by the contact, the third party application is launched by the remote communication client associated with the contact to enable collaboration with the user of the communication client.

14. The computer-implemented method of claim 13, wherein:

multiple contacts are selected from the contacts list maintained by the communication client, and if the third party application is launched for peer-to-peer collaboration, the communication client transmits only one resource invite to a first selected contact.

15. A computer-readable storage device storing computer-executable instructions that, when executed by a computing device, cause the computing device to perform a method comprising:

configuring registration data associated with a third party application that enables multiparty collaboration, the registration data including:

a globally unique identifier (GUID) identifying the third party application, a uniform resource locator specifying a remote location for downloading the third party application, a session type indicating whether the third party application is to be launched locally only, launched for peer-to-peer collaboration, or launched in a collaboration environment hosted by a communication server, and a path specifying a local location of the third party application and a set of tokenized input parameters to be resolved when the third party application is launched by a communication client on the computing device, wherein the set of tokenized input parameters includes a tokenized user identification (user ID) parameter and a tokenized contact identification (contact ID) parameter;

receiving a selection of a contact from a contacts list maintained by the communication client;

displaying, by the communication client, a user interface menu in response to the selection of the contact, wherein the user interface menu displayed by the communication client includes a menu item associated with the third party application;

supplying, by the communication client, values for resolving the set of tokenized input parameters in response to selection of the menu item associated with the third party application from the user interface menu displayed by the communication client, the values including:

a user ID value associated with a user of the communication client, and a contact ID value associated with the contact;

launching, by the communication client, the third party application in accordance with the session type, wherein:

the third party application is launched from the local location specified by the path with the tokenized user ID parameter resolved by the user ID value and the tokenized contact ID parameter resolved by the contact ID value, and the third party application is launched in a context related to the contact if the third party application is launched locally only; and transmitting, by the communication client, a resource invite if the third party application is launched for peer-to-peer collaboration or launched in the collaboration environment hosted by the communication server, wherein:

the communication client transmits the resource invite to a remote communication client associated with the contact if the third party application is launched for peer-to-peer collaboration, the communication client transmits the resource invite to the communication server for forwarding the resource invite to the remote communication client associated with the contact if the third party application is launched in the collaboration environment hosted by the communication server, the resource invite transmitted by the communication client includes at least the GUID identifying the third party application, the user ID value, and the contact ID value for enabling the remote communication client associated with the contact to launch the third party application and resolve the set of tokenized input parameters, the resource invite forwarded by the communication server to the remote communication client associated with the contact further includes a conference Uniform Resource Identifier (URI) associated with a collaboration session hosted by the communication server, and upon acceptance of the resource invite by the contact, the third party application is launched by the remote communication client associated with the contact to enable collaboration with the user of the communication client.

16. The computer-readable storage device of claim 15, wherein:

multiple contacts are selected from the contacts list maintained by the communication client, and if the third party application is launched for peer-to-peer collaboration, the communication client transmits only one resource invite to a first selected contact.

17. The computer-readable storage device of claim 15, wherein:

the set of tokenized input parameters further includes a tokenized conference URI parameter, and the values supplied by the communication client for resolving the tokenized set of input parameters include the URI associated with the collaboration session hosted by the communication server.

18. The computer-readable storage device of claim 15, wherein the values supplied by the communication client include a string of contact ID values if more than one contact is selected from the contacts list.

19. The computer-implemented method of claim 13, wherein:

the set of tokenized input parameters further includes a tokenized conference URI parameter, and the values supplied by the communication client for resolving the tokenized set of input parameters include the URI associated with the collaboration session hosted by the communication server.

20. The computer-implemented method of claim 13, wherein the values supplied by the communication client include a string of contact ID values if more than one contact is selected from the contacts list.

* * * * *